United States Patent [19]

Bouchard et al.

[11] Patent Number: 4,689,031

[45] Date of Patent: * Aug. 25, 1987

[54] METHOD FOR SEALING ARC DISCHARGE LAMPS

[75] Inventors: Andre C. Bouchard, Peabody; Mark Grossman, Belmont; William George, Rockport, all of Mass.

[73] Assignee: GTE Products Corporation, Danvers, Mass.

[ * ] Notice: The portion of the term of this patent subsequent to Dec. 24, 2002 has been disclaimed.

[21] Appl. No.: 869,543

[22] Filed: Jun. 2, 1986

Related U.S. Application Data

[62] Division of Ser. No. 615,622, May 31, 1984, abandoned.

[51] Int. Cl.$^4$ ............................................. H01J 9/40
[52] U.S. Cl. .................................... 445/26; 65/34; 445/33
[58] Field of Search .............. 445/22, 26, 43; 65/34; 313/318

[56] References Cited

U.S. PATENT DOCUMENTS

| | | | |
|---|---|---|---|
| 2,561,838 | 7/1951 | Bechard | 65/34 |
| 3,551,725 | 12/1970 | Brundige | 313/318 |
| 3,828,407 | 8/1974 | Boekkooi | 65/34 X |
| 4,508,514 | 4/1985 | English | 445/26 |
| 4,560,357 | 12/1985 | Bouchard et al. | 445/26 |

Primary Examiner—Kenneth J. Ramsey
Attorney, Agent, or Firm—Carlo S. Bessone; William H. McNeill

[57] ABSTRACT

A compact fluorescent lamp employs an inner exhaust tubulation formed from glass which is opaque to a given range of electromagnetic radiation. The exhaust tubulation is non-invasively sealed after an outer lamp envelope is sealed by directing upon the exhaust tubulation an amount of such radiation sufficient to heat the tubulation to its softening point. The outer envelope is transparent to the given radiation which, in a preferred embodiment, is in the range of 400 nm to 2500 nm.

4 Claims, 4 Drawing Figures

METHOD FOR SEALING ARC DISCHARGE LAMPS

This is a divisional of co-pending applicaton Ser. No. 615,622 filed on May 31, 1984, now abandoned.

TECHNICAL FIELD

This invention relates to arc discharge lamps and more particulary to fluorescent lamps. Still more particularly, the invention relates to sealing means for such lamps and to a method for achieving arc tight seals within a previously sealed envelope.

BACKGROUND ART

While the invention has wide application, its use will be described relative to compact fluorescent lamps.

The fluorescent lamp is the most widely utilized light source in the world for general illumination, primarily because of its relatively low initial cost and its efficacy: i.e., its light output relative to its power input, usually expressed as lumens per watt (LPW). Nevertheless, for home use, the fluorescent lamps has not taken precedence over the incandescent lamp. Many reasons have been advanced for this lack of acceptance, among them the poor color rendition of some fluorescent lamps and their need for a ballast. However, one of the major disadvantages lies in the fact that a fluorescent lamp is a linear light source whereas an incandescent lamp can almost be considered a point source. The typical fluorescent lamp has a length of from 18" to 8' and is somewhat cumbersome to work with.

With the increasing cost of energy, attempts have been made to overcome the latter difficulty. One of these attempts has utilized a plurality of fluorescent tubes having one or more smaller tubes connecting the ends of the fluorescent tubes to provide an arc path. Such lamps are shown in U.S. Pat. No. 3,501,662. Large, "U" shaped lamps such as those shown in U.S. Pat. Nos. 3,602,755; and 2,401,228; and triple bend lamps such as shown in U.S. Pat. No. 4,347,460 exemplify other attempts.

Still other attempts are shown in U.S. Pat. Nos. 4,208,618; 4,191,907; and Ser. No. 431,955 now U.S. Pat. No. 4,524,301,filed Sept.30, 1982 and assigned to the assignee of the instant invention.

While each of these proposals has its own advantages, disadvantages also exist. The previous forms of multiple tubing lamps are expensive to produce and difficult to handle during manufacture.

Many types require expensive, custom made partitions and/or require large numbers of hermetic seals. Mutliple bend tubes require large outlays for manufacturing equipment which adds to the cost of the final lamp.

Recently developed compact fluorescent lamps such as disclosed in U.S. Ser. No. 481,230 now U.S. Pat. No. 4,527,089, filed Apr. 1, 1983, and assigned to the assignee of the instant application, solved many of the above recited disadvantages and the teachings of U.S. Pat. No. 4,527,089 are hereby incorporated herein by reference.

Generally, these lamps comprise an inner lamp assembly mounted within an outer jacket. The inner assembly defines a long arc path in a compact shape and is exposed to an arc generating and sustaining atmosphere contained within the outer jacket. The outer jacket is hermetically sealed but the components of the inner assembly are not. Where necessary, they are fitted in an arc-tight manner but are open to the atmosphere contained within the outer jacket.

To aid in evacuating the inner assembly, it has been provided with an exhaust port, which can be separately formed in, for example, an arc director. Alternatively, open exhaust tubulations could be employed with the inner assembly.

While this system works well, it has been observed that on occasion the arc will leak from the provided exhaust tubulation and take a path other than that intended.

DISCLOSURE OF THE INVENTION

It is, therefore an object of this invention to obviate the disadvantages of the prior art.

It is another object of the invention to enhance the operation of compact lamps.

It is yet another object of the invention to provide a method of achieving arc tight seals.

Yet another object of the invention is the provision of an inner assembly exhaust tubulation which can be closed after a lamp is hermetically sealed.

These objects are accomplished, in one aspect of the invention, by the provision of arc discharge lamps containing novel sealing flares. These sealing flares comprise a first glass portion having lead-in wires sealed therein. A second glass portion forms an exhaust tubulation and is sealed to the first glass portion. The first glass portion is substantially transparent to a given range of electromagnetic radiation and the second glass portion is, in a preferred embodiment, substantially opaque to radiation in the given range. That is, the second glass portions absorbs such radiation and is heated thereby.

The novel sealing flare allows the use of a novel method of making fluorescent lamps. The method comprises forming an inner lamps assembly which includes at least one section of phosphor coated tubing having its ends sealed by the sealing flares described above. The inner lamp assembly is mounted within an envelope formed from glass transparent to the given range of radiation. The open end of the envelope is sealed in a manner to leave a second exhaust tubulation. The envelope and the inner assembly are exhausted through the second exhaust tubulation and subsequently filled with an arc generating and sustaining atmosphere, which includes mercury, through the second exhaust tubulation. The second exhaust tubulation is then sealed to hermetically close the envelope. Thereafter, radiation within the given range is directed through the envelope to impinge upon the opaque glass formed as an exhaust tubulation on the sealing flare of the inner assembly. The radiation is in an amount sufficient to raise the temperature of the opaque glass to its softening point.

This non-invasive sealing method at least closes the exhaust tubulation sufficiently to prevent arc leakage therefrom.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
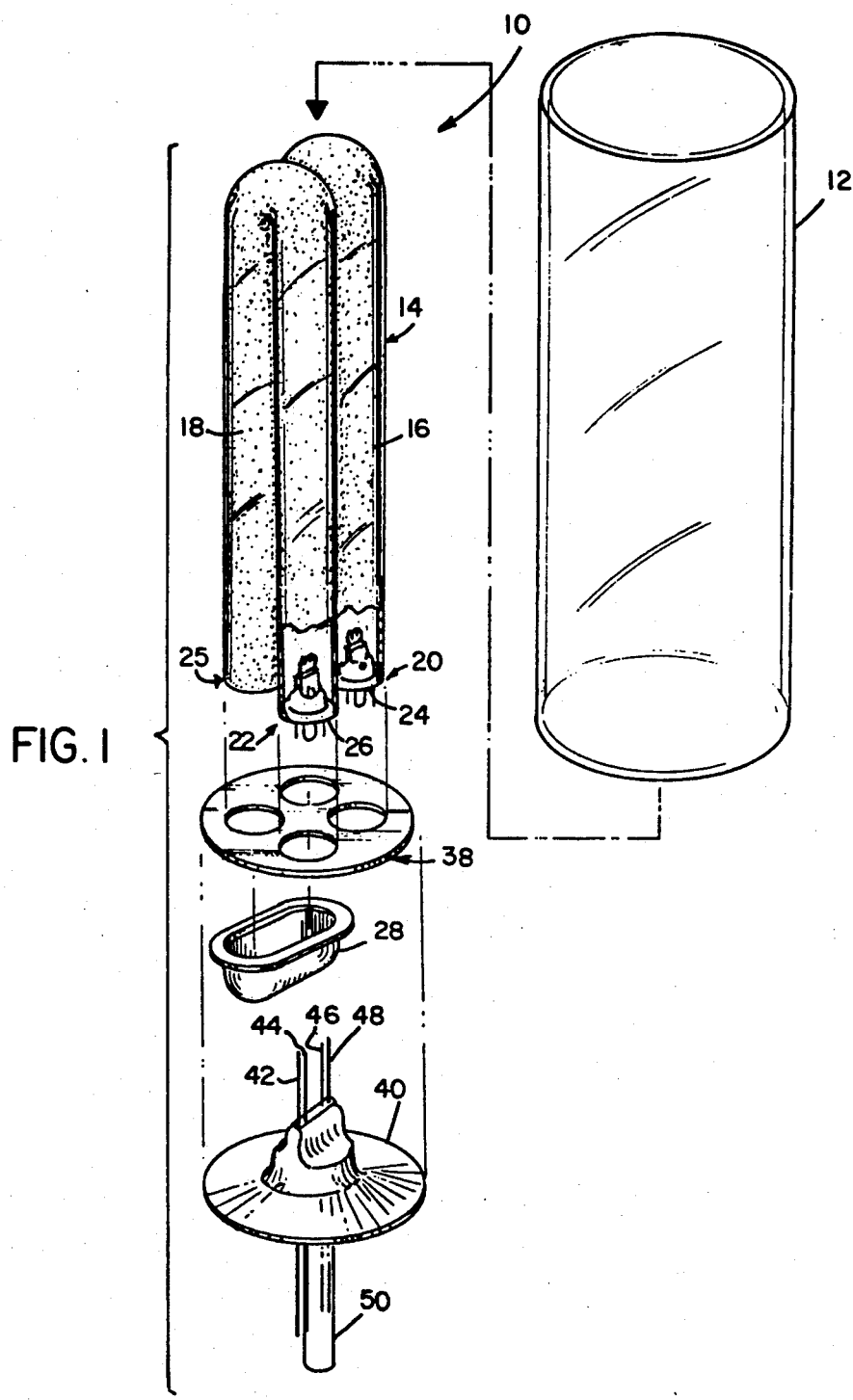
FIG. 1 is an exploded, perspective view of a lamp employing an embodiment of the invention.

Referring now to the drawings with greater particularlity, there is shown in FIG. 1 a compact fluorescent lamp 10 having an outer, light transmissive, glass envelope 12 which is transparent to a given range of electromagnetic radiation and which has mounted therein an inner lamp assembly 14. The inner lamp assembly 14 includes at least one phosphor coated tube. In the illustrated embodiment, two "U" shaped tubes 16 and 18 are employed. The tubes 16 and 18 have ends 20 and 22 which are closed by sealing flares 24 and 26. The other, or open, ends 25 and 27 of the tubes are connected via arc director 28, as taught in U.S. Pat. No. 4,527,089 assigned to the assignee of the instant invention, and the teachings of which are herein incorporated by reference.

Sealing flares 24 and 26 comprise a first glass portion 28 (see FIGS. 2 & 3) of a substantially transparent glass; i.e., glass which is transparent to a given range of radiation having sealed therein lead-in wires 30 and 32 having an electrode 34 affixed therebetween. A second glass portion 35 forms an exhaust tubulation 36 which is sealed to first glass portion 28. The exhaust tubulation is formed from glass which is opaque to radiation in the given range. To avoid strains, both first glass portion 28 and second glass portion 35 should have substantially the same coefficient of thermal expansion; however, in the preferred embodiment, second glass portion 35 should have a lower softening point.

In a preferred embodiment, the first glass portion can be a soda-lime glass such as Corning Glass Works type 0081. The "U" shaped tubes 16 and 18 and envelope 12 are preferably of the same material. Type 0081 glass has a softening point ($10^{7.6}$ poises) of 696° C. and a thermal expansion coefficient (0°–300° C.) of $93.5 \times 10^{-7}$/°C.

The second glass portion 35 can be Corning Glass Work type 9363, a potash, soda, lead glass having a softening point ($10^{7.6}$ poises) of 627° C. and a thermal expansion coefficient of $91.5 \times 10^{-7}$/°C. The approximately 70° C. difference in softening points is adequate to allow selective treatment of the second glass portion.

In a preferred embodiment the preferred range for the given range of electromagnetic radiation is between about 400 nm to 2500 nm and having a large component in the infra-red region of the spectrum. Of the glasses listed above, type 0081 is clear and strongly transmissive of both visible and infra-red radiation to 2500 nm. Type 9363, however, is green and strongly absorbtive of infra-red radiation, particularly at 1000 nm.

The lamp 10 is made by forming the inner assembly 14 which, in this instance, comprises the phosphor coated "U" tubes 16 and 18 having their ends 20 and 22 sealed with the sealing flares 24 and 26. The tubes are suitably mounted on a mounting plate 38 which also carries the arc director 28.

Figure 2:
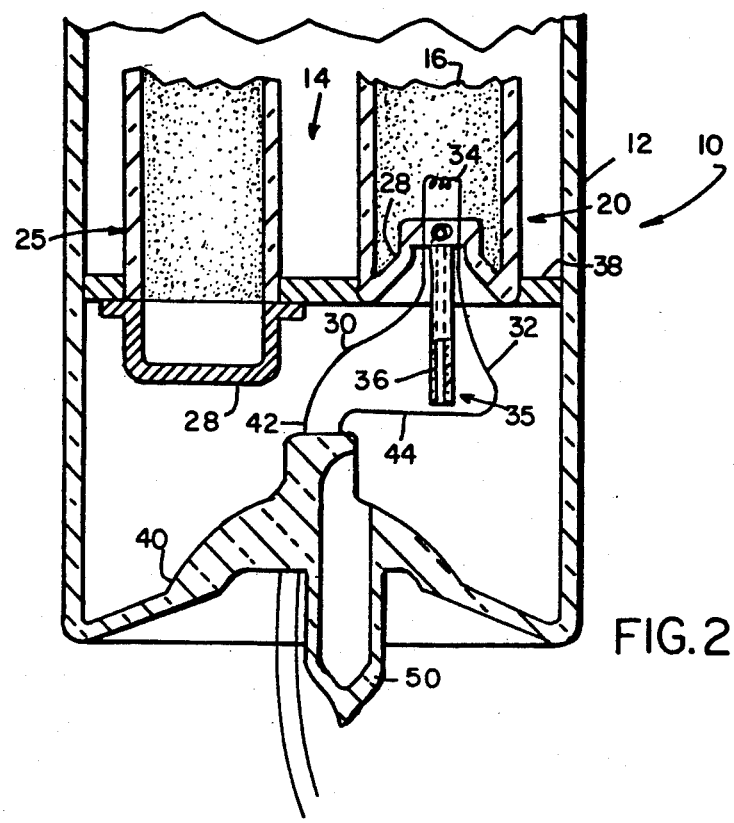
FIG. 2 is a partial, elevational, sectional view of the lamp of FIG. 1.
Figure 3:
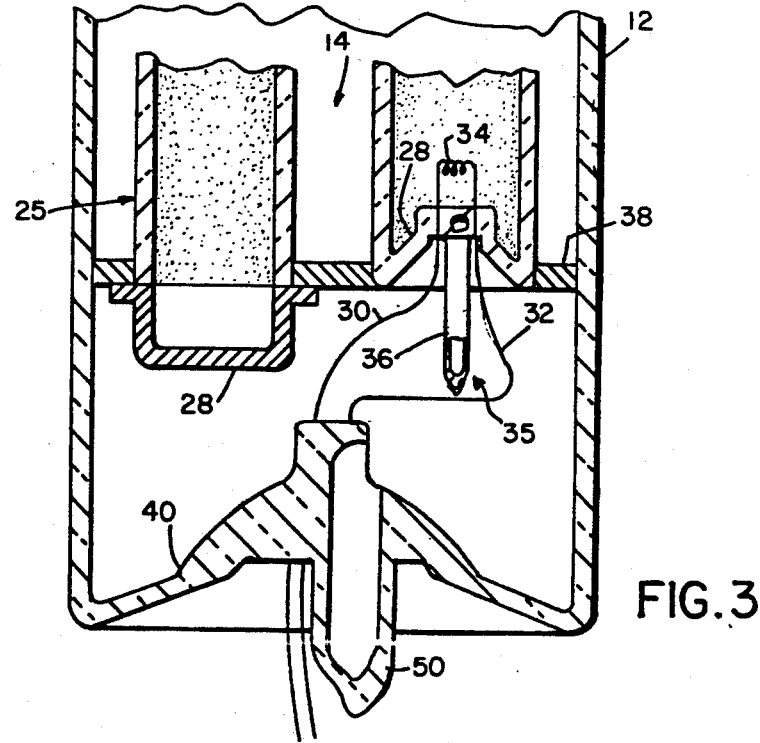
FIG. 3 is a view similar to FIG. 2 after closure.

The inner assembly 14 is then mounted upon a second sealing flare 40 which has sealed therein lead-in wires 42, 44, 46 and 48 for connection to the lead-ins of tubes 16 and 18. For clarity, only the lead-ins 42 and 44 are shown in FIGS. 2 and 3. Sealing flare 40 carries a second exhaust tubulation 50.

The inner assembly 14 is then inserted into envelope 12 and sealing flare 40 is sealed thereto by conventional means. Envelope 12 is then exhausted and filled with an arc generating and sustaining medium, e.g., about 20 mg of mercury and argon at a pressure of 3 torr, and exhasut tubulation 50 is sealed.

Lamp 10 is now in an operable condition since the arc generating and sustaining medium contained within envelope 12 penetrates the tubes 16 and 18 which are not indivdually hermetically sealed.

Experience has shown, however, that occasionally an arc will not follow its programmed path through the tubes and arc director from one electrode to another; but will "leak" out through the open exhaust tubulations 36 in flares 24 and 26.

This problem is eliminated herein by the novel flares employed and the steps below.

The opaque exhaust tubulations 36 are closed by directing radiation within the given range upon them. The radiation passes through the transmissive glass of envelope 12 and is absorbed by the tubulations 36; raising the temperature thereof to the softening point and causing the tubulation to close, as is shown in FIG. 3. It is to be noted that complete closure is not necessary, since a hermetic seal is not being formed. It is sufficient only to close the tubulation enough to prevent the arc from leaking.

Figure 4:
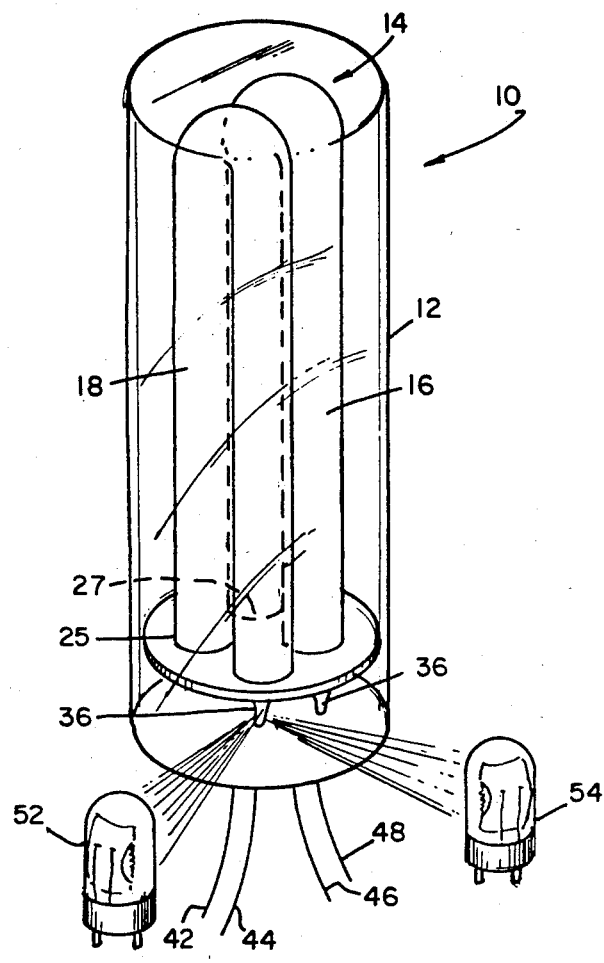
FIG. 4 is a diagrammatic, sectional view of a method of closure.

The procedure for this non-invasive sealing technique is illustrated in FIG. 4. While any number of radiation sources may be employed, a suitable method for the exemplary glasses mentioned herein is to use two obliquely positioned projector lamps 52 and 54 such as 150 W, type DCA, these lamps having a strong infra-red component. With such lamps the tubulations can be closed in 15 to 20 seconds.

Other radiation sources, such as lasers, for example, can be employed, so long as the inner glass to be sealed will absorb radiation to which the outer envelope is transparent.

There is thus provided a compact fluorescent lamp having enhanced operation achieved through the use of a novel sealing flare and a non-invasive sealing technique.

While there has been shown what are at present considered to be the preferred embodiments of the invention, it will be apparent to those skilled in the art that various changes and modifications can be made herein without departing from the scope of the invention as defined by the appended claims.

We claim:

1. In the method of making a fluorescent lamp the steps comprising: forming an inner lamp assembly including at least one section of phosphor coated tubing, said tubing having its ends closed by sealing flares mounting electrodes within said tubing, said flares comprising a first glass portion being substantially transparent to a given range of electromagnetic radiation and a second glass portion being substantially opaque to said given range of radiation formed as an exhaust tubulation; mounting said inner lamp assembly within an envelope formed from glass transparent to said given range of radiation; sealing an open end of said envelope while leaving a second exhaust tubulation, exhausting said envelope and inner lamp assembly through said second exhaust tubulation; filling said envelope with an arc generating and sustaining atmosphere, including mercury, through said second exhaust tubulation; sealing said second exhaust tubulation to hermetically seal said envelope; and directing radiation within said given range through said envelope upon said glass formed as an exhaust tubulation, said radiation being in an amount sufficient to raise the temperature of said opaque glass to its softening point.

2. The method of claim 1 wherein said opaque glass is heated sufficiently to at least substantially close said exhaust tubulation formed therefrom.

3. The method of claim 2 wherein said radiation emanates from two sources.

4. The method of claim 3 wherein said sources comprise projection lamps.

* * * * *